March 24, 1970 D. E. GRIFFEY 3,502,940

DYNAMIC BARKHAUSEN OSCILLATION SUPPRESSION

Filed Oct. 28, 1968

Inventor.
DONALD E. GRIFFEY

BY
Mueller, Aichele & Rauner
ATTYS.

United States Patent Office
3,502,940
Patented Mar. 24, 1970

3,502,940
DYNAMIC BARKHAUSEN OSCILLATION SUPPRESSION

Donald E. Griffey, Skokie, Ill., assignor to Motorola, Inc., Franklin Park, Ill., a corporation of Illinois Filed Oct. 28, 1968, Ser. No. 771,003
Int. Cl. H01j 29/70
U.S. Cl. 315—27 9 Claims

ABSTRACT OF THE DISCLOSURE

In a television deflection circuit utilizing a flyback transformer supplied with deflection signals from a pentode amplifier, Barkhausen oscillations are reduced or substantially attenuated by providing a tap on the negative AGC winding located on the flyback transformer and connecting the suppressor grid of the pentode directly to this tap. This causes a positive potential pulse to be applied to the suppressor grid of the pentode during the trace period; so that Barkhausen oscillations are eliminated or substantially reduced, even when the pentode is operating with high anode currents at a minimum or low anode potential relative to the potential present on the screen grid thereof.

BACKGROUND OF THE INVENTION

In a conventional television receiver, utilizing reaction tracing or scanning for producing horizontal deflection of an electron beam, an electromagnetic winding is associated with the cathode ray tube, the beam of which is to be deflected. The current wave in the electromagnetic winding is generally of a sawtooth shape and is caused to flow through the winding under control of a tube driver stage, the anode-cathode path of which is coupled in a suitable manner to the deflection winding. Generally the driver tube in the horizontal deflection circuit is a pentode having the anode connected to a transformer winding to which the deflection winding is coupled. A driving waveform in a sawtooth shape controls conduction of the driver tube, so that the anode conduction occurs therein during only the latter part of the tracing portion of the line deflection cycle.

At the conclusion of the tracing portion of the cycle, the sawtooth drive waveform causes the pentode to be rendered non-conductive, with the result that the deflection winding and the circuit associated therewith tends to oscillate at a relatively high frequency. The first half cycle of these oscillations is sufficient to produce flyback or retrace of the electron beam to its initial position for the next line tracing operation, and a damper circuit is provided to damp the oscillations at the end of this first half cycle and then provide, through energy stored in the damper circuit and in the deflection yoke and transformer, a portion of the forward deflection of the beam in the next line tracing movement. Thus, the entire line trace may be attributed to the action of both the damper circuit and the driver pentode.

When the pentode reaches a state of heavy conduction near the end of this trace cycle, the anode voltage drops to a relatively low potential, so that the potential on the screen grid of the pentode may be at a more positive potential than the potentials appearing on the anode, on the cathode, or on the control electrode of the tube. When this occurs, what is known as "snivets" are reproduced on the image of the television receiver in the form of thin, parallel, vertical lines which may appear at one or more positions of the reproduced image. It appears that the production of these thin vertical lines is due to Barkhausen oscillations developed in the horizontal output tube. These oscillations may be produced in a tube whenever a positive electrode is placed between two more negative electrodes. The electrons present in the tube then are alternately repelled by the more negative electrodes back toward the positive electrode, causing oscillations which may be in the video carrier frequency range of the receiver. The radiations then may be detected and passed through the receiver in substantially the same manner as the video signal, and are reproduced on the cathode ray tube screen in the form of the thin vertical lines or snivets.

Because Barkhausen oscillations and their harmonics usually are of relatively high frequency, the problem is encountered to only a limited extent in television receivers operating in the VHF range. With television receivers operating in the UHF range, however, the problem is substantially greater due to the wider frequency range being utilized in UHF transmission.

Attempts have been made to eliminate or attenuate Barkhausen oscillations in the pentode driving amplifier for the horizontal deflection circuits by connecting the suppressor grid through a resistor or resistors to a source of positive potential, in order to cause the suppressor grid to remain at a relatively positive potential, irrespective of the potential appearing on the anode of the tube. Another technique for reducing Barkhausen oscillations employs a resistor connected between the control grid of the horizontal deflection oscillator tube and the driver tube control grid. Since the oscillator tube draws grid current during a portion of its cycle, there is produced across its grid resistors a negative direct current voltage. Applications of this negative voltage from the oscillator tube grid to the driver tube grid causes the self-bias required to be developed by the driver tube to be reduced to a point such that the time during which the tube draws control grid current is substantially reduced, thereby minimizing the tendency of the tube to support Barkhausen oscillations. In both of these solutions to the Barkhausen oscillation problem, however, additional resistive components must be added to the circuit and result in corresponding increased expense and increased power consumption.

SUMMARY OF THE INVENTION

Accordingly it is an object of the present invention to eliminate or substantially reduce the production of snivets or Barkhausen oscillations during the reproduction of a televised image.

It is an additional object of the present invention to substantially reduce or eliminate Barkhausen oscillations in the horizontal deflection amplifier tube of a television receiver.

A further object of the present invention is to provide a new and improved circuit for substantially reducing or eliminating Barkhausen oscillations in the horizontal deflection output tube of a television receiver without the addition of any additional components to the circuit already present in the receiver.

These and other objects are accomplished in accordance with a preferred embodiment of the invention by providing a direct connection of a tap of the negative automatic gain control pulse forming winding of the flyback transformer to the suppressor grid of the pentode amplifier used as the horizontal output tube. During the trace or scan portion of the cycle of operation of the horizontal deflection circuit, a positive voltage pulse is obtained from the tap on the winding and is applied directly to the suppressor grid of the tube. This positive pulse then maintains the suppressor electrode at a potential which is positive relative to the cathode potential during the trace portion of the horizontal deflection cycle.

DETAILED DESCRIPTION

Figures 1, 2:
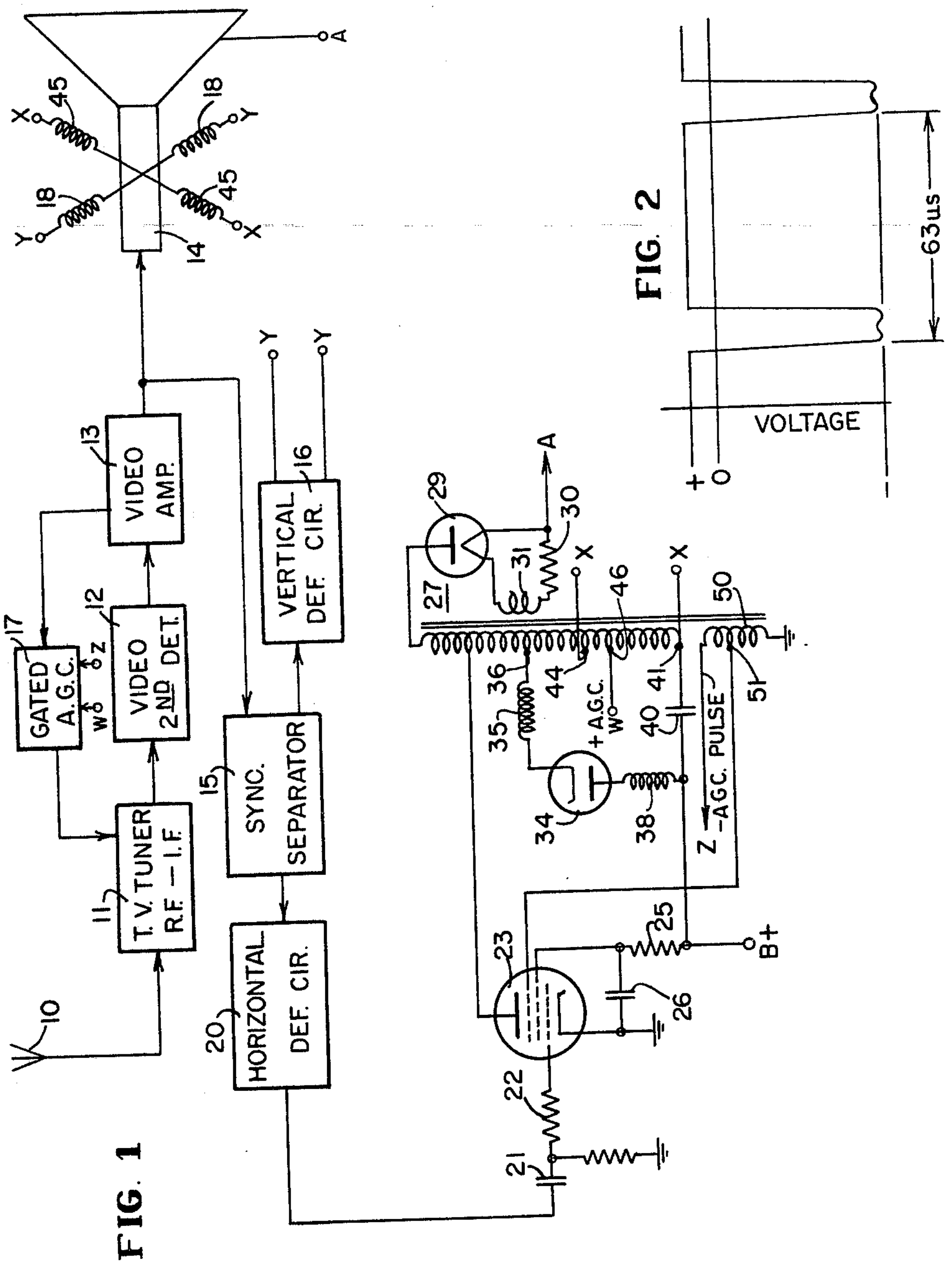
FIGURE 1 of the drawing is a combination block and schematic diagram of a portion of a television receiving circuit including a preferred embodiment of the present invention.
FIGURE 2 is a diagram of wave forms useful in explaining the operation of the circuit shown in FIGURE 1.

Referring now to FIGURE 1 of the drawing, there is shown a portion of a television receiving circuit useful in understanding the operation of the preferred embodiment of this invention. It will be apparent that not all of the portions of a television receiver have been illustrated in FIGURE 1, but the portions not illustrated have been eliminated in order to avoid unnecessarily complicating the drawing. It should be understood, however, that existing television circuits may be employed for those portions of the receiver which are not necessary in the description of a preferred embodiment of the invention.

In the receiver shown in FIGURE 1, signals are received by an antenna 10 and are applied to a TV tuner and the video IF amplifier stages grouped together in a block 11. The output of the IF stages in the block 11 is supplied to a video second detector 12 and a video amplifier 13 which are of conventional types. The output of the amplifier 13 in turn is applied to the cathode ray tube 14, a synchronizing signal separator circuit 15 and a gated AGC circuit 17, the output of which is supplied to the tuner 11. The separator circuit 15 separates the vertical and horizontal deflection synchronizing signals and supplies the vertical synchronizing signal to a vertical deflection circuit 16, which in turn provides an amplified vertical deflection signal at a pair of output terminals YY which are connected to the vertical yoke windings 18.

The synchronization signal separating circuit 15 also supplies a horizontal synchronizing signal to a horizontal signal deflection signal generator 20. The signal generator 20 includes a sawtooth oscillator which produces a sawtooth waveform through a coupling capacitor 21 and a resistor 22 to the control grid of a pentode 23 in order to control the conduction of the pentode 23.

The penode 23 is the horizontal deflection output amplifier tube of the television receiver and has a screen electrode connected to a source of positive potential through a resistor 25. The cathode of the tube 23 is connected to ground and is connected to the screen grid of the tube through a capacitor 26. Output signals obtained from the pentode 23 are coupled from the anode of the tube to an autotransformer or flyback transformer 27 which is the horizontal flyback transformer for the television receiver. The upper end of the winding on the transformer 27 is connected to the anode of a high voltage rectifier 29, the cathode of which is connected to a resistor 30 in series with a heater winding 31 on the transformer 27. High voltage developed at the cathode of the diode 29 is applied to the post-accelerating anode of the cathode ray tube by means of a terminal marked "A."

Since the deflection circuit shown in FIGURE 1 is a reaction scanning type, the cathode of a conventional damping diode 34 is connected through an inductor 35 to a tap 36 on the transformer winding. The anode of the diode 34 then is connected through an inductor 38 to the positive B+ supply terminal and also is connected through a capacitor 40 to another tap 41 on the winding of the transformer 27.

Horizontal output deflection signals are obtained from the winding of the transformer 27 on a pair of terminals marked XX, one of which is connected to the lower end of the winding of the transformer and the other of which is connected to a tap 44 located intermediate the ends of the winding of the transformer 27. The signals obtained over this portion of the winding of the transformer 27 are applied to the horizontal deflection coils 45 of the cathode ray tube 14.

The circuit thus far described is conventional; and as the horizontal sawtooth waveform obtained from the signal generator 20 is applied to the control grid of the amplifier tube 23, the tube 23 conducts during the latter portion of the trace period of the cathode ray tube deflection cycle in accordance with well known reaction scanning principles. As conduction through the tube 23 increases in response to the positive going portion of the sawtooth waveform, a deflection current flowing through the horizontal deflection coils 45 is produced to cause the electron beam in the tube 14 to be scanned or deflected from left to right on the television screen as viewed from the front.

As is well known, when the beam reaches its extreme right-most position in the scan, it must be rapidly returned to the left-hand side of the screen before making the next horizontal scan from left to right. This is accomplished during the negative going or retrace portion of the sawtooth waveform supplied by the signal generator 20 to the control grid of the pentode 23. When this occurs, the tube 23 is cut off and becomes non-conductive; and the sudden collapse of the magnetic field about the winding of the transformer 27 produces a sudden voltage surge across the horizontal deflection yoke due to the collapsing magnetic field and starts an oscillation and current reversal in the horizontal deflection windings 45 which results in a rapid retrace of the beam from the right-hand side of the screen to the left-hand side of the screen.

The positive pulse which occurs immediately when the magnetic field about the winding of the transformer 27 collapses is followed by a negative pulse representing an oscillation of the tuned circuit associated with the autotransformer 27, the horizontal deflection coils 45 and the associated circuitry. When the negative half cycle of oscillation commences, the diode 34 is rendered conductive, placing a low resistance load across the circuit. This damps the oscillation and the current decays slowly, moving the beam from the left edge of the television screen as viewed from the front to a point which is approximately 30% of the distance across the screen. When this 30% point is reached, the pentode 23 takes over the remainder of the horizontal trace in a conventional manner.

In the circuit described above, when the tube 23 reaches the point in its operating cycle wherein it has its maximum screen current condition and maximum cathode electron emission at its minimum anode voltage condition (the knee of the pentode operating characteristic), it has been noted that Barkhausen oscillation can take place. It appears that this oscillation is caused by the electrons striking the anode, giving rise to secondary emission electrons from the anode. Normally these secondary emission electrons would be attracted back to the anode by the high positive potential thereon relative to the other potentials appearing within the tube. At the condition of minimum anode potential, however, during the conductive cycle, the potential on the screen electrode of the tube 23 may be so much higher than the anode potential that the secondary emission electrons are attracted toward the screen away from the anode. When this occurs, the conditions for Barkhausen oscillations exist, and the secondary emission electrons may oscillate about the screen electrode to produce the Barkhausen oscillations and the RF radiation, as indicated hereinbefore, to result in the production of snivets on the viewed image. These snivets are produced during the portion of the cycle when the pentode 23 is conducting its maximum current, so that they appear in the right hand portion of the television screen toward the end of the cycle of the trace being controlled by the tube 23.

Already present in the television receiver of which the tube 23 is a part is a secondary winding 50 on the transformer 27, this secondary winding 50 being connected to ground at one end and producing the negative AGC pulse for use in conjunction with the positive AGC pulse obtained from a tap 45 on the transformer 27 to control the AGC gate 17 at terminals "W" and "Z." The negative pulse produced in the winding 50 occurs at the time the tube 23 is rendered nonconductive resulting in the collapse of flux in the transformer 27; and as a consequence, this pulse also is supplied to the phase detection circuits and is used as the blanking pulse for the receiver.

During the time that an active trace of the beam is being accomplished in the horizontal direction, however, a relatively constant positive pulse can be derived from a tap 51 on the winding 50. The tap 51 then is connected directly to the suppressor grid of the pentode 23, so that during the active scan or trace controlled by the horizontal deflection circuit, the positive pulse on the suppressor grid of the tube 23 drives the grid to a higher positive potential than that present on the cathode during the trace. This positive pulse is substantially higher than the potential present on the cathode, so that any electrons which are repelled or emitted by the anode of the tube 23 are attracted to the suppressor electrode and very few, if any of them, return past the screen grid of the tube 23. As a consequence, substantially no electrons will oscillate about the screen electrode of the tube 23, and if any electrons do continue to so oscillate, they are very small in number and the frequency of the oscillations should be substantially changed. As a result, any radiation which might occur should be at such a low level that little if any of this radiation will be converted to snivet forming signals.

The pulses applied to the suppressor grid of the tube 23 are illustrated in FIGURE 2, which shows a current wave form at tap 51 for one full cycle of operation of the horizontal deflection circuit. It should be noted that this cycle is approximately 63 microseconds in duration, and that at the beginning of the cycle, that is during the retrace interval, a negative pulse of high voltage and lasting for approximately one-fifth of the cycle of operation appears on the tap 51. A negative pulse of greater magnitude also is supplied as the negative blanking pulse from the other end of the winding 50. Following the retrace period, a positive pulse is induced in the winding 50 during the trace period, and appears on the tap 51 as shown by the flat, upper portion of the waveform in FIG. 2.

The location of the tap 51 near the center of the winding 50 is necessitated by the fact that a connection from the top of the winding 50 to the suppressor grid of the tube 23 would result in the application of a negative pulse having a magnitude which could damage the tube 23 during the retrace interval, even though the higher positive pulse obtained during the trace period would be desirable. The location of the tap 51 is a compromise which reduces the negative pulse applied to the suppressor during retrace to a safe value, but which still applies a sufficiently high positive pulse during the trace period to prevent the Barkhausen oscillations. The exact location of the tap 51 is determined by the circuit parameters, especially those of the tube 23.

Thus, without adding any components to the circuit, a positive biasing pulse is obtained and applied to the suppressor grid of the tube 23 during the trace or active scan of the horizontal deflection circuit merely by tapping a source of voltage pulses already present in the television receiver of which the horizontal deflection circuit is a part.

Thus, Barkhausen oscillations are eliminated or substantially reduced while at the same time eliminating the biasing resistors necessary to achieve the same results. Since the biasing resistors have been eliminated from the circuit, power consumption is reduced and a more inexpensive control providing substantially the same end result is obtained. It should be noted that the small amounts of secondary emission which might cause Barkhausen oscillations during the negative pulse applied to the suppressor grid during the retrace periods of operation cause no problems, since this same negative pulse also is used to control the blanking circuits, rendering the receiver insensitive to signals during the retrace interval. As a consequence, even though Barkhausen oscillations might possibly take place during the retrace interval, they have no affect on the operation of the set as seen by a viewer.

I claim:

1. An electromagnetic scanning system for providing a signal having relatively slow trace periods alternating with relatively fast retrace periods including in combination:
- an electron discharge device having a cathode, an anode and at least control and suppressor electrodes;
- an inductive device;
- means for connecting the anode of the electron discharge device to the inductive device;
- means for rendering the electron discharge device conducting during at least a portion of each trace period; and
- means for pulsing the suppressor electrode of the electron discharge device to a potential higher than the potential on the cathode thereof during substantially all of the trace period.

2. A system according to claim 1 wherein an electromagnetic beam deflection yoke is connected to the inductive device.

3. A system according to claim 1 wherein the means for pulsing the suppressor electrode to a higher potential than the potential on the cathode includes a winding inductively coupled to the inductive device.

4. A system according to claim 3 wherein the means for pulsing the suppressor electrode to a higher potential than the potential on the cathode during the trace period includes a tap on the winding, said tap being connected directly to the suppressor electrode.

5. An electromagnetic system for deflecting an electron beam during alternate relatively slow trace and relatively fast retrace periods including in combination:
- an electron discharge device having at least cathode, anode, control and suppressor electrodes;
- an inductive device;
- means connected to the inductive device for utilizing signals produced in the inductive device;
- means for connecting the anode of the electron discharge device to the inductive device;
- means coupled to the control electrode of the electron discharge device for rendering the electron discharge device conductive during at least a portion of each relatively slow trace period and for rendering the electron discharge device non-conductive during each relatively fast retrace period;
- means for deriving a substantially constant potential from the inductive device during the trace period and for supplying said potential to the suppressor electrode of the electron discharge device, said derived potential being more positive during the trace period than the potential on the cathode of the electron discharge device.

6. A system according to claim 5 wherein the means for deriving said potential includes an inductively coupled winding on the inductive device, with a direct connection between said inductively coupled winding and the suppressor electrode of the electron discharge device.

7. A system according to claim 5 wherein the utilization device is an electromagnetic beam deflection yoke.

8. A system according to claim 7 further including a damper circuit connected to the inductive device for receiving and storing energy derived from the yoke and the inductive device during each retrace period and for returning the stored energy to the yoke during the initial portion of each trace period.

9. A system according to claim 5 wherein the inductive device is a transformer and the means for supplying a potential to the suppressor electrode is a secondary winding on said transformer, said secondary winding having a connector extending directly therefrom to the suppressor electrode of the electron discharge device.

References Cited

UNITED STATES PATENTS

| | | | |
|---|---|---|---|
| 3,196,309 | 7/1965 | Liu | 315—27 |
| 3,287,596 | 11/1966 | Rhodes et al. | 315—27 |

RODNEY D. BENNETT, Jr., Primary Examiner

J. G. BAXTER, Assistant Examiner